(12) United States Patent
Shane

(10) Patent No.: US 9,974,232 B2
(45) Date of Patent: May 22, 2018

(54) SPREADER WIDTH CONTROL

(71) Applicant: CNH Industrial America LLC, New Holland, PA (US)

(72) Inventor: Nicholas S. Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 566 days.

(21) Appl. No.: 14/298,175

(22) Filed: Jun. 6, 2014

(65) Prior Publication Data

US 2015/0351321 A1 Dec. 10, 2015

(51) Int. Cl.
*A01D 41/127* (2006.01)
*A01D 41/12* (2006.01)

(52) U.S. Cl.
CPC ....... *A01D 41/1243* (2013.01); *A01D 41/127* (2013.01)

(58) Field of Classification Search
CPC .......... A01D 41/1243; A01D 41/127–41/1278
USPC .............................. 460/111–113, 901; 701/50
See application file for complete search history.

(56) References Cited

U.S. PATENT DOCUMENTS

| | | | |
|---|---|---|---|
| 5,569,081 A | 10/1996 | Baumgarten et al. | |
| 6,604,995 B2 * | 8/2003 | Dillon | A01D 41/02 460/111 |
| 6,729,953 B2 * | 5/2004 | Bueermann | A01F 12/40 460/112 |
| 6,783,454 B2 * | 8/2004 | Bueermann | A01F 12/40 460/112 |
| 6,840,853 B2 * | 1/2005 | Foth | A01F 12/40 460/111 |
| 6,939,221 B1 * | 9/2005 | Redekop | A01D 41/1243 460/111 |
| 7,086,942 B2 * | 8/2006 | Niermann | A01D 41/1243 460/111 |
| 7,223,168 B2 * | 5/2007 | Anderson | A01F 12/40 460/111 |

(Continued)

FOREIGN PATENT DOCUMENTS

| | | |
|---|---|---|
| EP | 0 537 621 A2 | 10/1992 |
| EP | 2 936 962 A1 | 10/2015 |

OTHER PUBLICATIONS

European Office Action dated Feb. 23, 2017 for European Patent Application No. 15 170 824.5 (4 pages).

*Primary Examiner* — Thomas B Will
*Assistant Examiner* — Joan D Misa
(74) *Attorney, Agent, or Firm* — Patrick M. Sheldrake

(57) ABSTRACT

A spreader system for discharging residue from an agricultural combine to a ground surface. The spreader system including a direction detector and a spreader operatively connected to a rear end of the agricultural combine. The direction detector is configured to detect direction changes of the agricultural combine and to produce a signal representative of the direction change. The spreader includes one or more impellers and a housing, with the impellers being operatively connected to the housing for rotating therein. The housing having an inlet for receiving a flow of residue, an outlet coupled to the housing for discharging the flow of residue, and one or more residue flow directors. The residue flow directors are configured to alter the flow of residue from the agricultural combine, the system being configured to alter the flow of residue dependent upon the signal.

20 Claims, 6 Drawing Sheets

(56) References Cited

U.S. PATENT DOCUMENTS

| | | | |
|---|---|---|---|
| 7,261,633 B2* | 8/2007 | Benes | A01D 41/1243 460/111 |
| 7,281,974 B2* | 10/2007 | Anderson | A01F 12/40 460/111 |
| 7,306,174 B2* | 12/2007 | Pearson | A01F 12/40 239/663 |
| 7,390,253 B2* | 6/2008 | Farley | A01D 41/1243 239/673 |
| 7,487,024 B2* | 2/2009 | Farley | A01D 41/1243 701/50 |
| 8,010,262 B2 | 8/2011 | Schroeder et al. | |
| 8,463,510 B2 | 6/2013 | Knapp | |
| 8,777,707 B2* | 7/2014 | Hoyle | A01B 79/005 460/111 |
| 8,961,284 B2* | 2/2015 | Wagner | A01D 41/1243 460/112 |
| 9,066,470 B2* | 6/2015 | Ricketts | A01D 41/1243 |
| 9,661,801 B2* | 5/2017 | Bastin | A01C 17/006 |
| 2006/0183519 A1* | 8/2006 | Benes | A01D 41/1243 460/111 |
| 2009/0287380 A1 | 11/2009 | Chervenka et al. | |
| 2011/0023435 A1* | 2/2011 | Matousek | A01D 43/006 56/341 |
| 2011/0023439 A1* | 2/2011 | Kendrick | A01D 41/1243 56/341 |
| 2011/0093169 A1* | 4/2011 | Schroeder | A01D 41/1243 701/50 |
| 2011/0270495 A1* | 11/2011 | Knapp | A01B 79/005 701/50 |
| 2012/0178509 A1 | 7/2012 | Eggenhaus et al. | |
| 2013/0095899 A1* | 4/2013 | Knapp | A01D 41/1243 460/111 |
| 2013/0324199 A1* | 12/2013 | Roberge | A01D 41/1243 460/111 |
| 2014/0080555 A1* | 3/2014 | Wagner | A01D 41/1243 460/112 |
| 2014/0083071 A1* | 3/2014 | Fay, II | A01D 34/667 56/15.6 |

* cited by examiner

SPREADER WIDTH CONTROL

BACKGROUND OF THE INVENTION

1. Field of the Invention

The present invention relates to a system and method for optimization of crop residue spreading operation, with an adjustable spreader.

2. Description of the Related Art

In common harvesting operations where a combine is used to cut or pick up crop while traveling through a field, it is generally desired to leave the residue in a compact windrow for eventual pickup, or to evenly distribute the residue or MOG (material other than grain) evenly across the entire cut width. Returning the material to the ground provides nutrients for future crops. It is important that MOG be spread evenly such that all future plants have a consistent seed bed, but also because bunched or thicker distribution of straw and chaff, the residue or MOG, can make future field operations more challenging.

During the spreading of crop residue onto a field, changes in the direction of the combine impact the direction of the spread of residue on the field. For example, when a 90 degree turn is executed part of the field on the inside of the curve will receive little or no residue, while on the outside of the curve the residue will be spread outside of the path of travel, with some potentially falling on unharvested crops. When residue falls on unharvested crops it can reduce the yield for that area and cause the residue to be reintroduced into the combine, thereby reducing efficiency. Non-uniform distributions of the residue can also affect future crops since the soil nutrients derived from the crop residue are not evenly distributed on the field.

What is needed is a system and method for optimization of residue spreading so that the residue may be spread evenly onto the field.

SUMMARY OF THE INVENTION

Embodiments of the present invention provide a system and method to optimize residue spread for even distribution of residue onto a field from a combine.

The invention in one form is directed to a spreader system for discharging residue from an agricultural combine to a ground surface. The spreader system including a direction detector and a spreader operatively connected to a rear end of the agricultural combine. The direction detector is configured to detect direction changes of the agricultural combine and to produce a signal representative of the direction change. The spreader includes one or more impellers and a housing, with the impellers being operatively connected to the housing for rotating therein. The housing having an inlet for receiving a flow of residue, an outlet coupled to the housing for discharging the flow of residue, and one or more residue flow directors. The residue flow directors are configured to alter the flow of residue from the agricultural combine, the system being configured to alter the flow of residue dependent upon the signal.

The invention in another form is directed to an agricultural harvesting system including a chassis, a plurality of ground support devices carrying the chassis and a threshing section carried by the chassis. The threshing section produces an agricultural residue. There is also a spreader system for discharging the residue to a ground surface, spreader system for discharging residue from an agricultural combine to a ground surface. The spreader system including a direction detector and a spreader operatively connected to a rear end of the agricultural combine. The direction detector is configured to detect direction changes of the agricultural combine and to produce a signal representative of the direction change. The spreader includes one or more impellers and a housing, with the impellers being operatively connected to the housing for rotating therein. The housing having an inlet for receiving a flow of residue, an outlet coupled to the housing for discharging the flow of residue, and one or more residue flow directors. The residue flow directors are configured to alter the flow of residue from the agricultural combine, the system being configured to alter the flow of residue dependent upon the signal.

The invention in yet another form is directed to a method of spreading residue from an agricultural harvesting apparatus to a ground surface, the method includes the steps of detecting a direction change of the agricultural harvesting apparatus; producing a signal representative of the direction change; spreading residue from a spreader operatively connected to a rear end of the agricultural harvesting apparatus; and altering a flow of the residue from the agricultural harvesting apparatus dependent upon the signal.

Advantageously, the present invention detects a turn and alters the spreader components to cause the trajectory of the residue to land in the harvested area.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
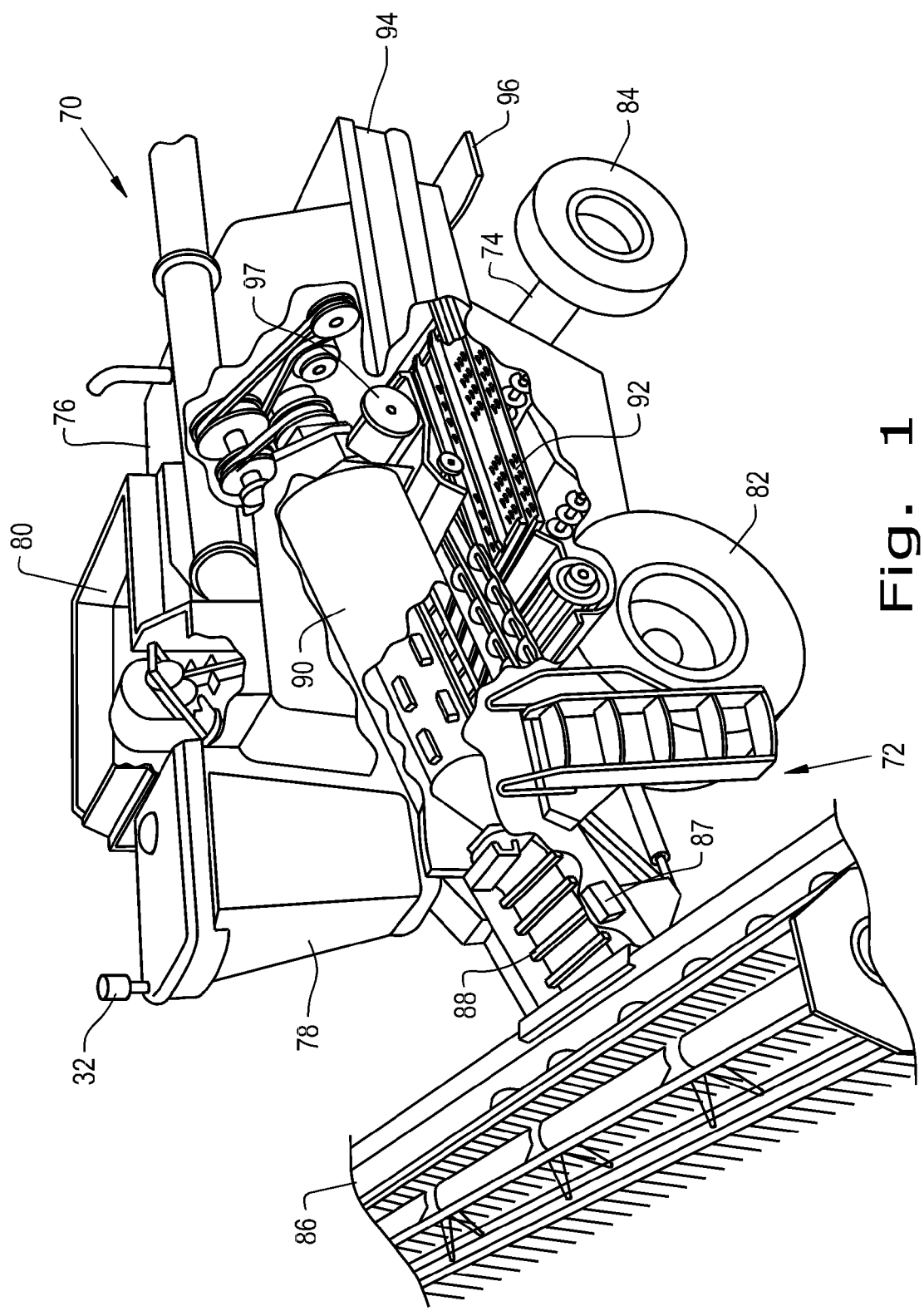
FIG. 1 illustrates a side view of a harvester combine with an attached header, threshing rotor, and spreader according to one embodiment of the present invention.
Figure 2:
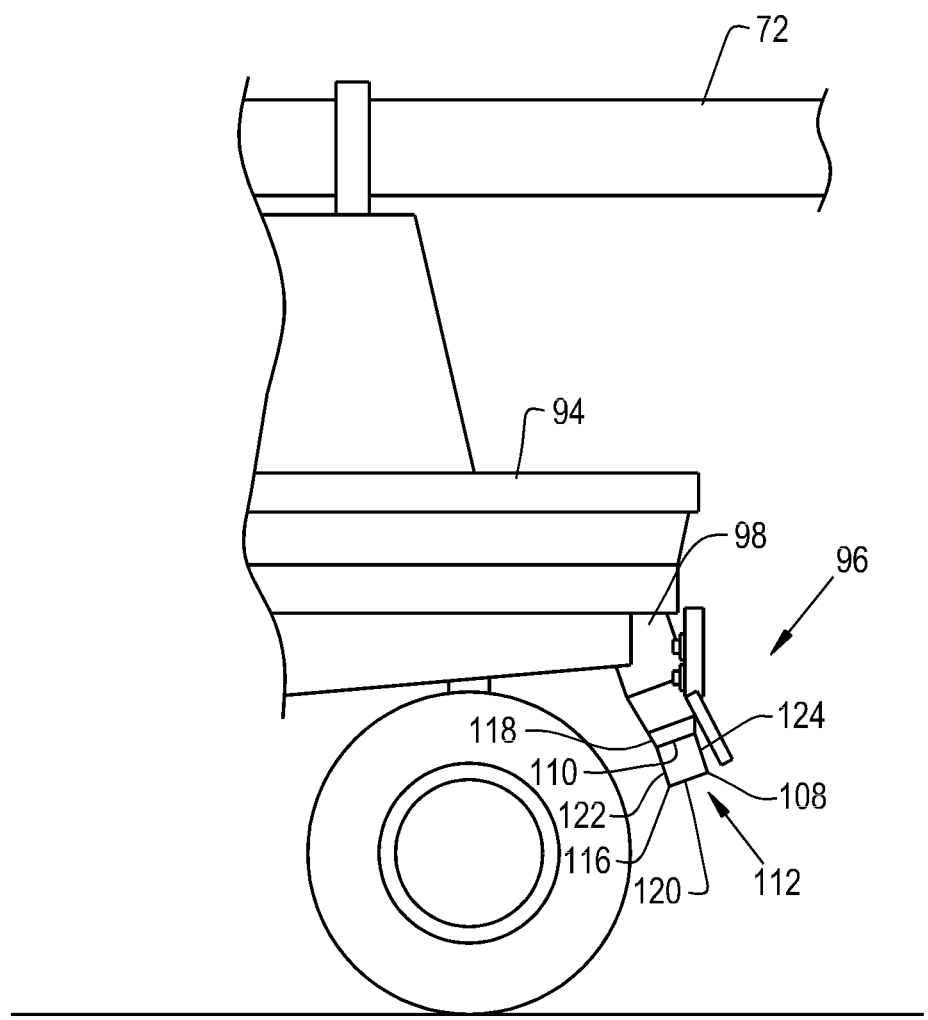
FIG. 2 illustrates a fragmentary, side view of the harvester from FIG. 1A.
Figure 3:
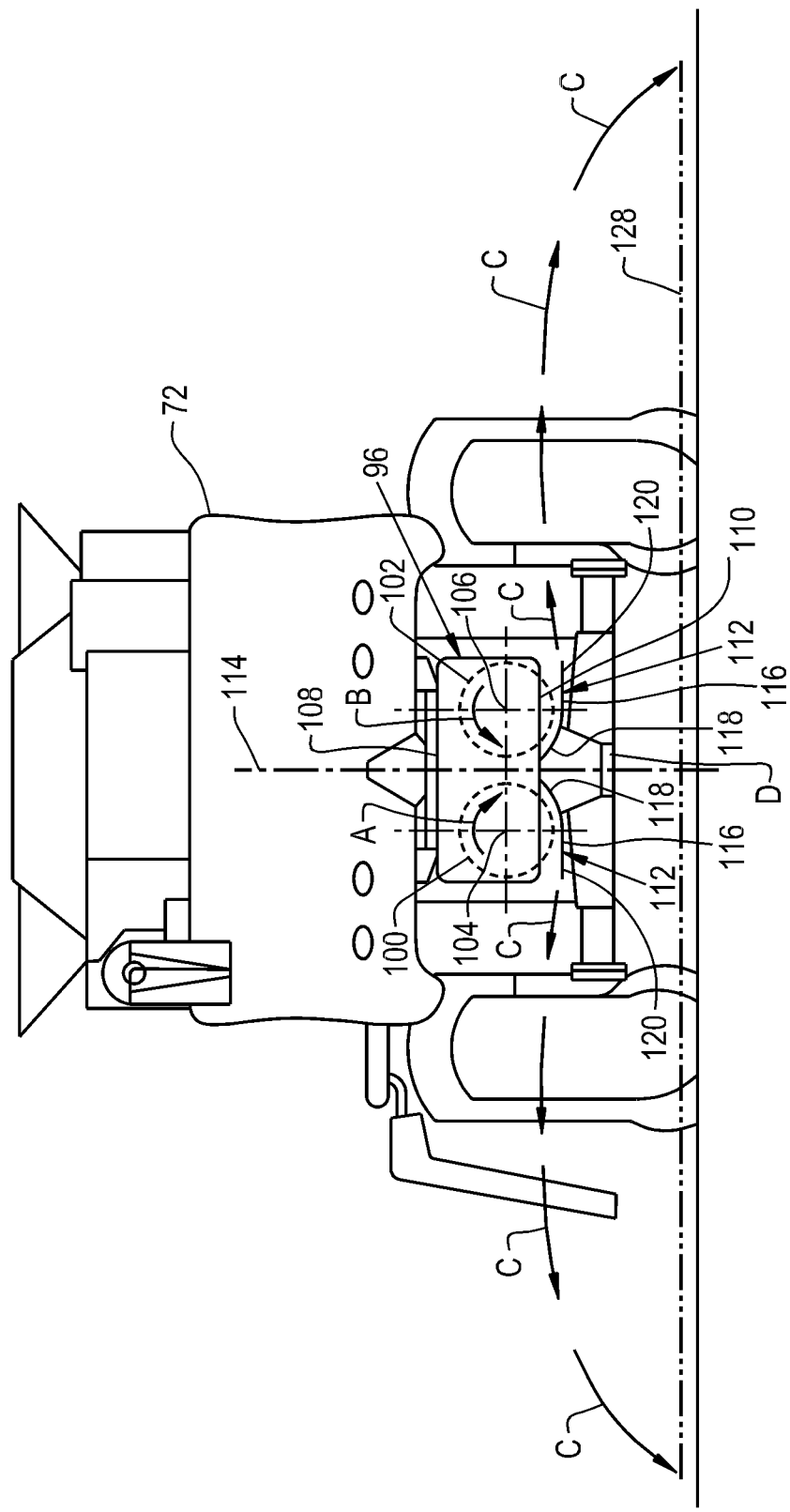
FIG. 3 illustrates an end view of the harvester combine of FIG. 1A, particularly showing the residue spreader on the rear of the combine according to one embodiment of the present invention.

Referring now to the drawings, and more particularly to FIGS. 1-3, there is illustrated an agricultural system 70 which includes agricultural harvesting equipment such as a combine 72 which is used for harvest. Combine 72 is depicted as a mobile agricultural work vehicle including a chassis/frame 74, to which are installed a main body 76, an operator's station or cab 78, a grain tank 80, an engine (not shown), and ground support devices including drive wheels 82 and steerable wheels 84. However, the ground support devices could also be endless crawler tracks.

Header 86 is shown in FIG. 1, which is commonly referred to as a grain header and is typically utilized for harvesting smaller grains, such as, but not limited to, wheat and soybeans. Headers such as header 86 used for this purpose can have a variety of widths, for instance, from about twenty to about forty five feet, as is well known. Another well known header is a corn header, and will typically be of a six, eight, twelve or sixteen row variety, and will have an overall width of from about fifteen to about forty feet. Header 86, as well as other headers (not shown), are configured to be interchangeably mounted on the front end of a feeder 88 of combine 72 in the well-known, conventional manner, for configuring combine 72 for harvesting a particular crop. A header detector 87 is also shown in FIG. 1, as connected on the combine 72.

The crops harvested by a header 86 will be gathered up by header 86 and conveyed by feeder 88 rearwardly and upwardly into the body of combine 72, for processing by a threshing system. The threshing system comprises a thresher 90, which is located within main body 76 and is disposed to receive the crop materials from feeder 88. Thresher 90 separates kernels of grain from larger pieces of other crop materials, referred to herein as MOG (materials other than grain). The grain kernels are then conveyed to a winnowing, or cleaning section 92, where smaller bits of MOG, debris, dust, etc. are removed by mechanical agitation and a stream of air. Although combine 72 is depicted as an axial-flow combine (i.e., having a threshing system with a generally longitudinally disposed axis of rotation), the concepts described herein may also be used on other types of combines including those having threshers with transversely disposed axes of rotation.

Quite often a machine of this nature must harvest additional material other than the main product in order to complete the separation process. The excess material (herein referred to as crop residue, or simply as residue) is typically chopped or shredded and propelled from the rear 94 of the combine 72 by way of spreader 96.

Attached on combine 72 is a sensing device 32, as shown or similarly, on or about spreader 96 for detecting attributes that can be used to optimize the residue spreading function of spreader 96 of the combine 72. Sensing device 32, may be a direction detector 32, such as a GPS system, sensing device 32 can also be configured to detect wind speeds. Sensing device 32 can also be connected to agricultural system 70 at a variety of other locations, and particularly to a communication and control system. Sensing device 32 may be a steering angle sensor to thereby detect commanded changes in direction. The sensing device 32 may be connected to the communication and control system.

Further, sensing device 32 may contain any of the sensors to sense temperature, relative humidity, barometric pressure, cloud cover, and trends thereof. The sensing device 32 may sense one or more various wind characteristics, such as wind speed and wind direction. Wind direction and speed change can reduce the harvesting machine's ability to spread the residue uniformly onto the ground surface. By using the information provided by the sensing device 32, such as wind speed and wind direction, adjustments for residue spreading may be automatically made in real time, relative to the speed and direction of combine 72 travel. The communication and control system may incorporate connection of various other sensors (not shown) in the combine 72 to receive information pertaining to combine 72 travel and the location of edges of the adjacent standing crops.

Combines equipped with a GPS may be used to determine the direction and speed of combine 72. This data may be necessary in making the necessary corrections to compensate for wind speed and direction changes of combine 72, as analyzed and determined by a controller.

Referring particularly to FIGS. 2 and 3, a rear end 94 of combine 72 is shown, including a vertical crop residue spreader 96 operable for spreading straw, stalks, and other crop residue and MOG that has been separated from the grain of the crops by thresher 90 of combine 72 located forwardly of rear end 94. The straw, stalks and the like are propelled rearwardly by rotating beaters or the like (also not shown) from the threshing mechanism and downwardly through a rear cavity of combine 72 to spreader 96 for spreading and optionally chopping. In other embodiments, a spreader may be positioned as a horizontal spreader that propels threshed residue in a like manner to a vertical spreader, wherein both may be designated as spreader 96.

Spreader 96 includes a housing 98 of sheet metal or other construction containing a pair of side by side rotary impellers 100 and 102 rotatable in opposite predetermined rotational directions, denoted by arrows A and B, about a pair of rotational axis 104 and 106, respectively. Housing 98 defines a forwardly and upwardly facing inlet opening for receiving the residue flow from the threshing system, and a downwardly facing discharge opening 110, or outlet, through which the residue is propelled downwardly and in opposite sideward directions by impellers 100 and 102, respectively. The discharge opening 110 may be configured about the lateral side of the housing 98. Here, it should be understood that impellers 100 and 102 are representative of a variety of rotary devices that can be utilized in a spreader of this type, such as a rotor having fixed blades, or carrying a plurality of knives, such as flail knives, for propelling the crop residue outwardly from the housing from the inlet and out through the outlet. The spreader can additionally optionally include a rank of fixed knives through which the rotating knives pass for chopping crop residue.

Impellers 100 and 102 are rotated by suitable driving elements, herein referred to as motors, such as by conventionally constructed and operable hydraulic motors powered by pressurized hydraulic fluid received from a pump (not shown) of combine 72, an electric motor, belt, or the like, again in the well known manner. Rotational axes 104 and 106 extend at least generally in the fore and aft directions, that is, generally forwardly and rearwardly with respect to combine 72, and are generally horizontal or oriented at a small acute angle to horizontal, depending on an orientation or tilt of spreader 96 on combine 72, which can be optionally variable and adjustable in the well known manner.

Residue flow within housing 98 is propelled by rotating impellers 100 and 102 in the predetermined rotational directions A and B along circumferential flow paths, at speeds equal to or increased relative to the inlet speed of the residue flow such that the residue does not build up at the inlet and is expelled from housing 98 through discharge opening 110 at a corresponding speed. In the instance wherein spreader 96 is solely used for spreading, the speed imparted to the residue by impellers 100 and 102 will be sufficient for airborne travel of the residue a substantial sideward distance from combine 72 for deposition on regions of the agricultural field over which combine 72 has just traveled and from which the crops have been harvested.

As noted above, it is desired in many instances to distribute the crop residue discharged by impellers 100 and 102 substantially evenly over the width of a swath of the field from which the crop has just been harvested by combine 72, which width is typically defined by the overall width of a harvesting head 86 of combine 72, which width can be as small as twenty feet and as large as forty-five feet in the instance of some heads currently in use. Spreader 96 may include a pair of adjustable crop residue flow distributors 112 connected to or about the discharge opening 110, or outlet, about the lateral side of the housing 98. Crop residue flow distributors 112 are mirror images of one another, and thus can be described and discussed singularly when appropriate, and are positioned for use in cooperation with respective impellers 100 and 102 of spreader 96 for receiving and carrying flows of crop residue discharged through discharge opening 110, in opposite sideward directions outwardly away from spreader 96, for distribution in a desired pattern on sides of a just harvested swath of a field over which combine 72 is moving. Here, it should be understood that by the term "sideward" what is meant is a direction transverse the fore and aft directions, the term "sidewardly outwardly" thus meaning sidewardly away from a center line 114 of spreader 96, the term "sidewardly inwardly" meaning closer to center line 114.

Each of flow distributors 112 preferably includes a flow guide of suitable, rigid construction, such as of sheet metal, or plastics, having a first end portion 118 supported adjacent to discharge opening 110 in the vicinity of center line 114 in a position so as to receive at least a portion of the crop residue flow discharged through about the outlet. Flow guide 116, or guide 116, includes a second end portion 120 opposite first end portion 118, and a fore edge 122 and an opposite aft edge 124 extending between first and second end portions 118 and 120 defining a crop residue flow surface 126 extending between end portions 118 and 120 for guiding and carrying the received crop residue flow sidewardly outwardly away from spreader 96 and distributing the crop residue, illustrated by strings of oppositely directed arrows C and downwardly toward D in FIG. 3, for distribution in a pattern on a field on the ground surface, represented by dotted line 128 in FIG. 3, having desired characteristics, such as uniformity and evenness of crop residue distribution.

Flow guides 116 are supported on spreader 96, by an adjustable support structure, so as to be at least generally aligned with center line 114 of spreader 96. Spreader 96 includes at least two impellers 100, 102 to perform the spreading process, along with the flow distributors 112, which are used to aid the impellers in the spreading process. By adjusting the flow guides 116, the residue spreading can be adjusted in order to accommodate different combine header widths or changes due to weather conditions, including wind changes, and still perform a quality job of residue distribution.

This same methodology could be used in machines which use fan type spreaders in order to distribute granulated fertilizers on a field. These machines use impellers to throw the granules to each side of the applicator. The spread width can be adjusted by increasing or decreasing the speed of the impellers, adjusting the height of the impellers, or adjusting the vanes which are typically located on both sides of the impeller in order to negate the effects of a lateral wind.

Figure 4:
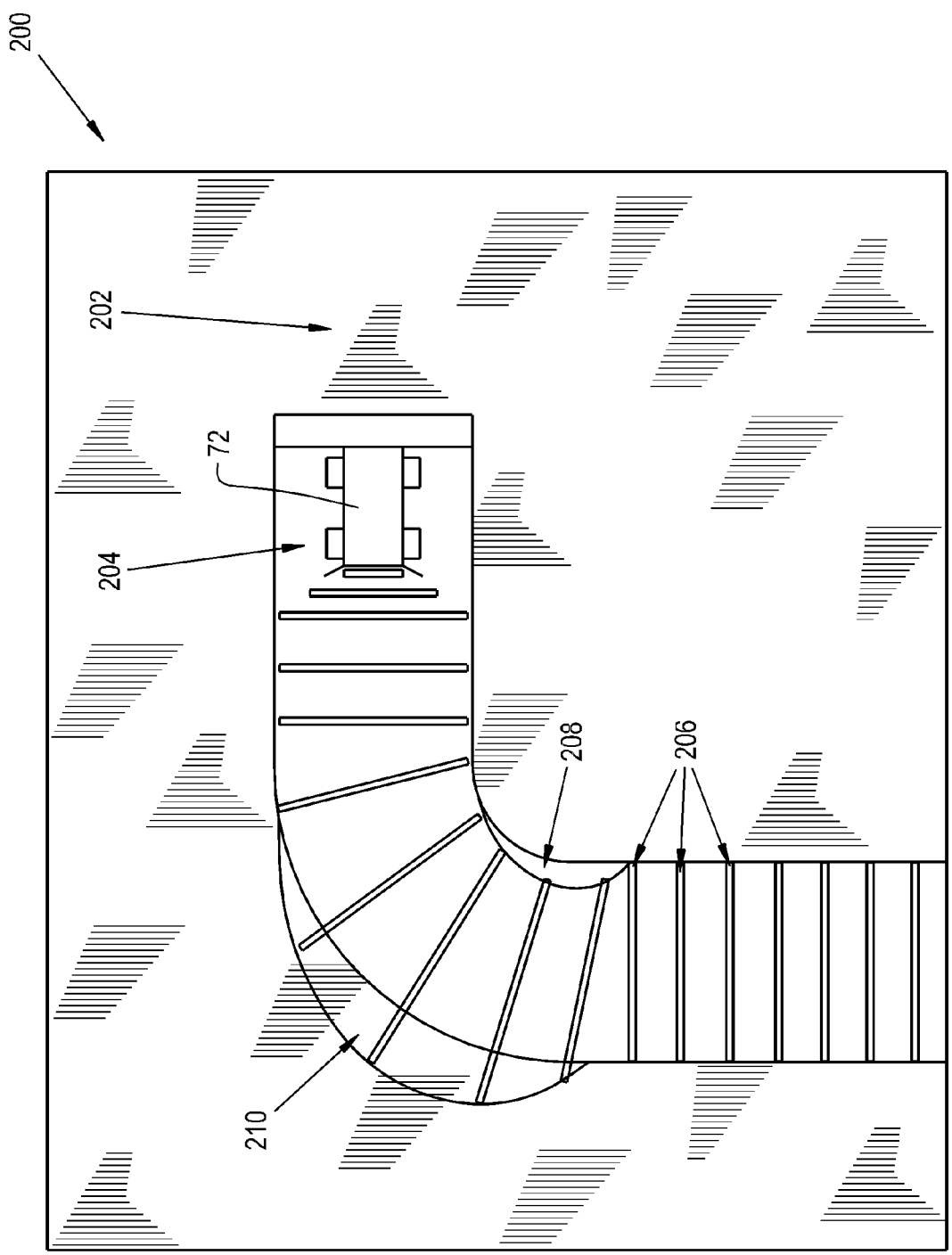
FIG. 4 is a schematical representation of a combine path that both illustrates the problem overcome by the invention and the result of using the invention.

Now, additionally referring to FIG. 4 there is shown a field 200 having an area of standing crop 202. Harvester 72 has cut and harvested the crop in area 204. The residue from harvester 72, using a prior art spreading system, is shown as being distributed in a pattern with the width being denoted as lines 206. As harvester 72 makes a right hand turn the pattern from a prior art spreader leaves a bare or missed area 208 and puts residue in an area 210, which is an area that overlaps into area 202. When the prior art combine, which may have rear wheel steering, turns sharply while harvesting the residue expelled at the rear of the machine is over-spread in the opposite direction that the combine is turning and under-spread in the direction the combine turns. When an operator is cutting, especially when there is standing crop 202 on both sides of the header, and makes a sharp turn, such as to cut around an object like a waterway, telephone pole, etc., then the residue is over-spread 210 into standing crop 202 on one side of the machine and there is a bare spot 208 left on the other.

Throwing residue material into standing crop 202 can make it difficult to harvest the area that is over-spread 210 on the next pass and potentially knocks grain out of the standing crop. Additionally, practices such as no-till are used by farmers, in which bare spots and/or spots that get double spread are undesirable. With the present invention, residue from harvester 72 is spread in area 204 without creating an over-spread area 210 or under-spread area 208.

Figure 5:
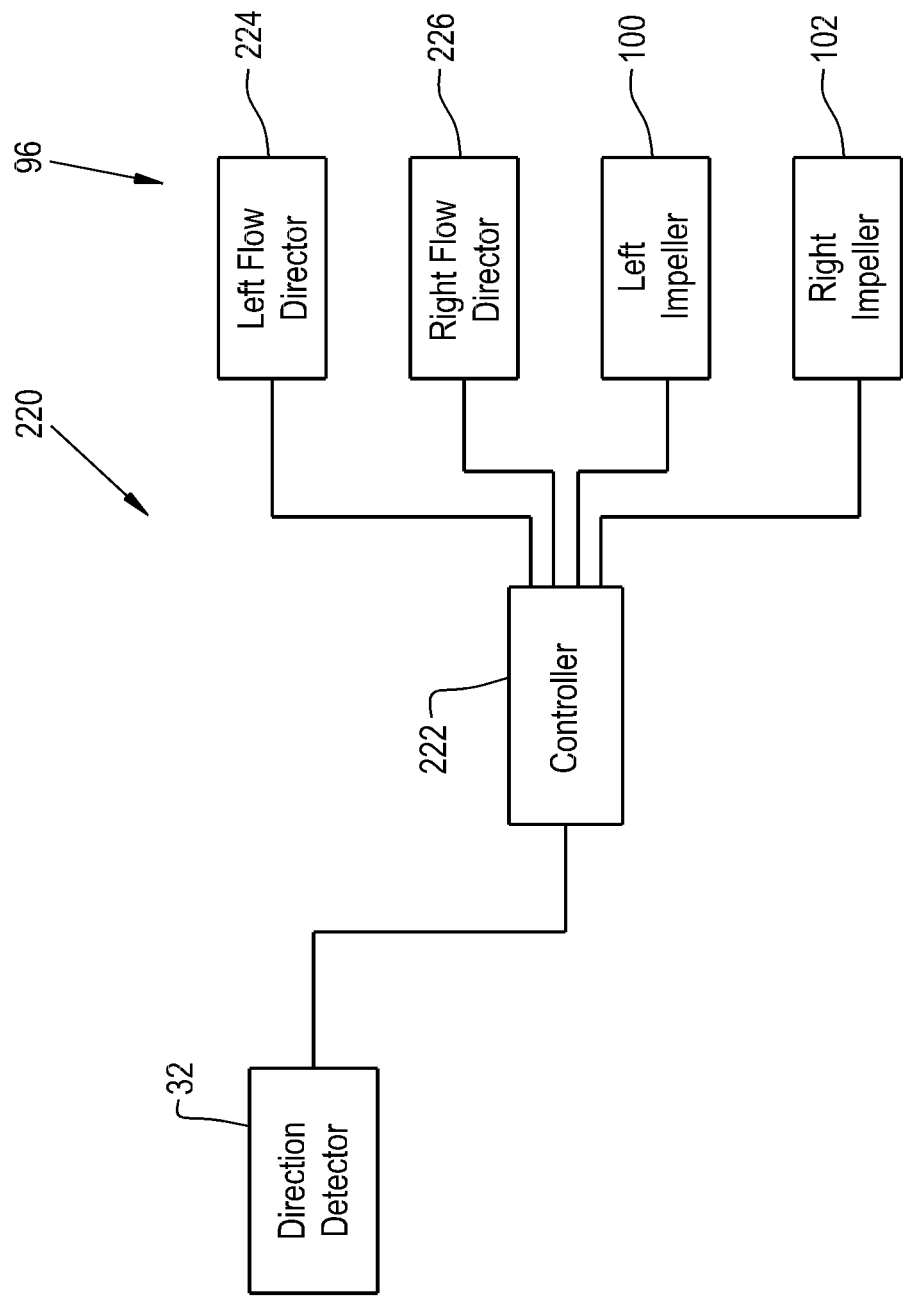
FIG. 5 is a schematical block diagram illustrating in a conceptual form an embodiment of the control system of the present invention.

Now, additionally referring to FIG. 5, the present invention is carried out by way of a spreader system 220 that includes a controller 222 and spreader 96 having a left flow director 224 and a right flow director 226, both of which can be thought of as being a combination of flow distributors 112 and flow guides 116, which have been described above. Flow directors 224 and 226 can be thought of as any mechanism that alters the trajectory of the residue as it leaves harvester 72.

The trajectory of the residue is also altered by changes in speed of impellers 100 and 102. Controller 222 receives a signal from direction detector 32 and communicates commands to impellers 100 and 102, and flow directors 224 and 226 depending upon the information conveyed in the signal to alter the trajectory of the residue due to the turn or change in direction of harvester 72. The functions described here as being carried out by controller 222 may be carried out by a controller that executes other functions on harvester 72. While modifications in the trajectory may be needed for other reasons, such as the wind speed and direction, as alluded to above, the changes to the trajectory of the residue relative to the turning of harvester 72 is what will be exclusively focused on hereafter, with the understanding that other compensations may otherwise alter the trajectory of the residue.

Figure 6:
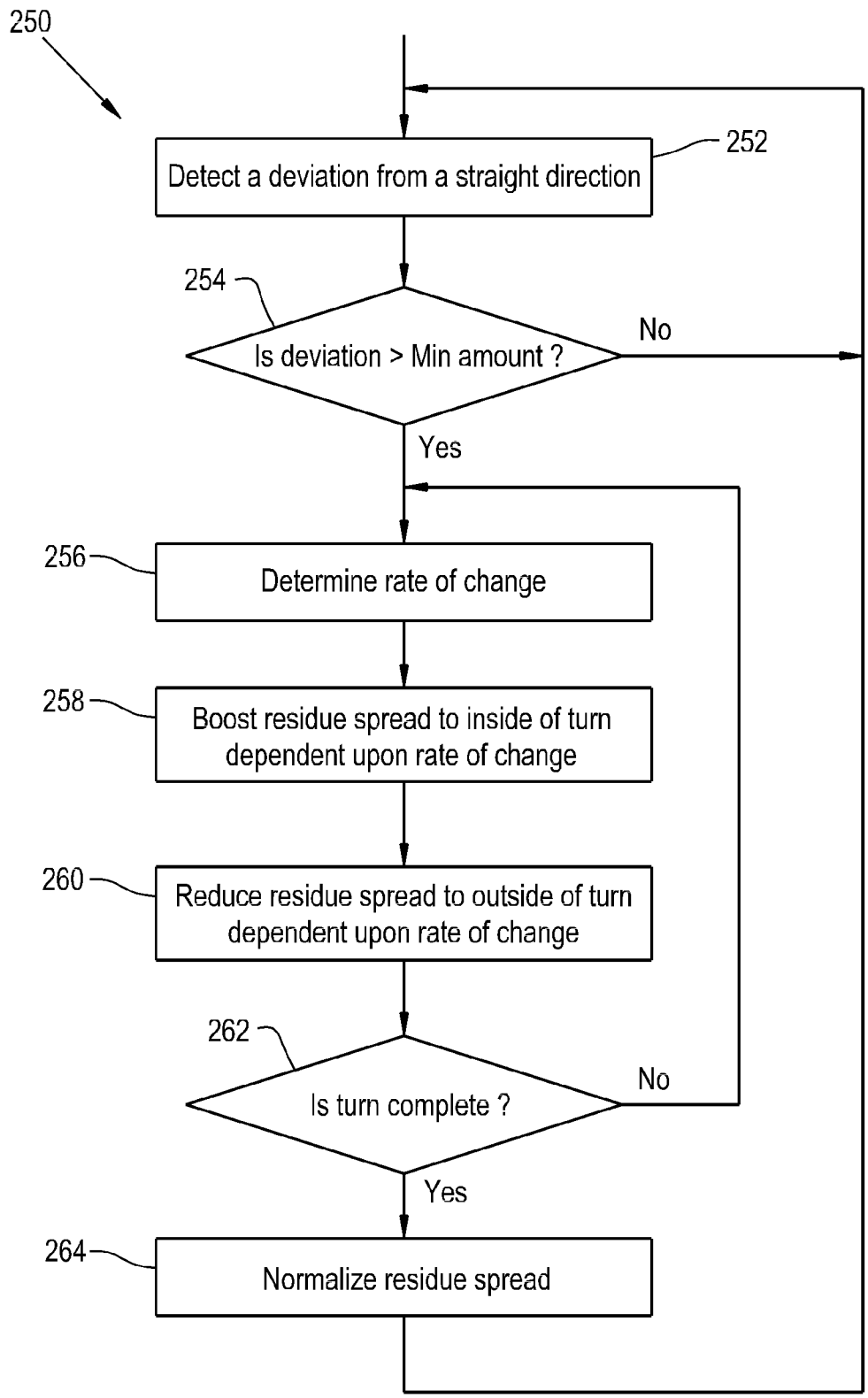
FIG. 6 is a flowchart that illustrates an embodiment of a method of the present invention.

Now, additionally referring to FIG. 6 there is shown a flowchart of a method 250 for the spreading of residue from harvester 72 carried out by controller 222. A deviation from a straight direction of travel of harvester 72 is detected at step 252, by direction detector 32. If the deviation is less than a minimal predetermined amount, such as a 2 degree steering deviation from a straight line of travel, then method 250 returns to step 252. However, if the deviation is greater than the predetermined amount then controller 222 determines the rate of change at step 256 from the signal sent by direction detector 32 to controller 222. Based on the rate of direction change, controller 222 boosts the residue spread to the inside of the turn and reduces the residue spread to the outside of the turn at steps 258 and 260. The amount of the boost and reduction is controlled as the steering changes so that the residue falls in area 204, particularly during the turn.

When the turn is completed, as determined at step 262 then method 250 proceeds to step 264, with the residue spread being returned to the normal control, unaffected by method 250.

It is contemplated that spreader system 220 may alter the flow of residue by directing more of the residue to either left residue flow director 224 or right residue flow director 226. Also, and more specifically, as shown in FIG. 4, spreader system 220 may be configured so that when direction detector 32 detects a right turn that left residue flow director 224 imparts less energy to the residue flowing therethrough and right residue flow director 226 imparts more energy to the residue flowing therethrough.

It is also contemplated that spreader system 220 may be configured so that when direction detector 32 detects a right turn that left residue flow director 224 directs the residue flowing therethrough at a first angle and right residue flow director 226 directs the residue flowing therethrough at a second angle. With, the first angle being directed more toward the ground than the second angle thereby changing the trajectory of the residue.

Yet another way of considering the actions of spreader system 220 is such that when direction detector 32 detects a right turn that left residue flow director 224 spreads the residue flowing therethrough to a reduced distance and right residue flow director 226 is configured to spread the residue flowing therethrough to a greater distance.

The actions for a left hand turn being a mirror image type of reaction to those discussed above for a right hand turn.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvesting system, comprising:
   a chassis;
   a plurality of ground support devices carrying said chassis;
   a threshing section carried by said chassis, said threshing section producing residue; and
   a spreader system for discharging the residue to a ground surface, said spreader system including:
      a direction detector configured to detect direction changes of the agricultural harvesting system and to produce a signal representative of the direction changes;
      a controller determining a rate of direction change from said signal representative of the direction changes;
      a spreader operatively connected to a rear end of the agricultural harvesting system, the spreader including:
         one or more impellers; and
         a housing, said impellers being operatively connected to said housing for rotating therein, said housing having:
            an inlet for receiving a flow of residue;
            an outlet coupled to said housing for discharging the flow of residue; and
            one or more residue flow directors configured to alter the flow of residue from the agricultural harvesting system, the spreader system being configured to alter the flow of residue dependent upon the rate of the direction change determined by said controller.

2. The agricultural harvesting system of claim 1, wherein said direction detector is one of a steering angle sensor and a positioning system.

3. The agricultural harvesting system of claim 1, wherein said controller is communicatively coupled to said residue flow directors and to said direction detector, said residue flow directors including a left residue flow director and a right residue flow director, said controller altering at least one of said left residue flow director and said right residue flow director dependent upon said signal.

4. The agricultural harvesting system of claim 3, wherein the flow of residue is altered by directing more of the residue to one of said left residue flow director and said right residue flow director.

5. The agricultural harvesting system of claim 3, wherein said controller is configured so that when said direction detector detects a right turn that said left residue flow director imparts less energy to the residue flowing therethrough and said right residue flow director imparts more energy to the residue flowing therethrough.

6. The agricultural harvesting system of claim 3, wherein said controller is configured so that when said direction detector detects a right turn that said left residue flow director directs the residue flowing therethrough at a first angle and said right residue flow director directs the residue flowing therethrough at a second angle, said first angle being directed more toward the ground than said second angle.

7. The agricultural harvesting system of claim 3, wherein said controller is configured so that when said direction detector detects a right turn that said left residue flow director is configured to spread the residue flowing therethrough to a reduced distance and said right residue flow director is configured to spread the residue flowing therethrough to a greater distance.

8. A spreader system for discharging residue from an agricultural combine to a ground surface, comprising:
   a direction detector configured to detect direction changes of the agricultural combine and to produce a signal representative of the direction changes;
   a controller configured to determine a rate of direction change from said signal representative of the direction changes; and
   a spreader operatively connected to a rear end of the agricultural combine, the spreader including:
      one or more impellers; and
      a housing, said impellers being operatively connected to said housing for rotating therein, said housing having:
         an inlet for receiving a flow of residue;
         an outlet coupled to said housing for discharging the flow of residue; and
         one or more residue flow directors configured to alter the flow of residue from the agricultural combine, the system being configured to alter the flow of residue dependent upon the rate of the direction change.

9. The spreader system of claim 8, wherein said direction detector is one of a steering angle sensor and a positioning system.

10. The spreader system of claim 8, wherein said controller is communicatively coupled to said residue flow directors and to said direction detector, said residue flow directors including a left residue flow director and a right residue flow director, said controller altering at least one of said left residue flow director and said right residue flow director dependent upon said signal.

11. The spreader system of claim 10, wherein the flow of residue is altered by directing more of the residue to one of said left residue flow director and said right residue flow director.

12. The spreader system of claim 10, wherein said controller is configured so that when said direction detector detects a right turn that said left residue flow director imparts less energy to the residue flowing therethrough and said right residue flow director imparts more energy to the residue flowing therethrough.

13. The spreader system of claim 10, wherein said controller is configured so that when said direction detector detects a right turn that said left residue flow director directs the residue flowing therethrough at a first angle and said right residue flow director directs the residue flowing therethrough at a second angle, said first angle being directed more toward the ground than said second angle.

14. The spreader system of claim 10, wherein said controller is configured so that when said direction detector detects a right turn that said left residue flow director is configured to spread the residue flowing therethrough to a reduced distance and said right residue flow director is configured to spread the residue flowing therethrough to a greater distance.

15. A method of spreading residue from an agricultural harvesting apparatus to a ground surface, the method comprising the steps of:
   producing a signal representative of a direction change;
   determining a rate of direction change of the agricultural harvesting apparatus from the signal;
   spreading residue from a spreader operatively connected to a rear end of the agricultural harvesting apparatus; and
   altering a flow of the residue from the agricultural harvesting apparatus dependent upon the rate of direction change determined in said determining step.

16. The method of claim 15, wherein the spreader includes:
   one or more impellers; and
   a housing, said impellers being operatively connected to said housing for rotating therein, said housing having:
      an inlet for receiving a flow of the residue;
      an outlet coupled to said housing for discharging the flow of residue; and
      one or more residue flow directors configured to alter the flow of residue from the agricultural harvesting apparatus, the system being configured to alter the flow of the residue dependent upon said signal.

17. The method of claim 16, wherein said producing step uses one of a steering angle sensor and a positioning system to detect the direction change.

18. The method of claim 16, wherein said residue flow directors include a left residue flow director and a right residue flow director, the method altering at least one of said left residue flow director and said right residue flow director dependent upon said signal.

19. The method of claim 18, wherein the flow of residue is altered by directing more of the residue to one of said left residue flow director and said right residue flow director.

20. The method of claim 18, wherein when said detecting step detects a right turn of the agricultural harvesting apparatus that a controller directs said left residue flow director to impart less energy to the residue flowing therethrough and said right residue flow director to impart more energy to the residue flowing therethrough.

* * * * *